(12) United States Patent
Li

(10) Patent No.: US 11,032,184 B2
(45) Date of Patent: Jun. 8, 2021

(54) METHOD AND DEVICE FOR COLLECTING TRAFFIC FLOW VALUE OF BGP COMMUNITY ATTRIBUTE OR BGP EXTENDED COMMUNITY ATTRIBUTE

(71) Applicant: CHINA MOBILE COMMUNICATIONS GROUP CO., LTD., Beijing (CN)

(72) Inventor: Zhenqiang Li, Beijing (CN)

(73) Assignee: China Mobile Communications Group Co., Ltd., Beijing (CN)

( * ) Notice: Subject to any disclaimer, the term of this patent is extended or adjusted under 35 U.S.C. 154(b) by 492 days.

(21) Appl. No.: 15/776,277

(22) PCT Filed: Jan. 16, 2017

(86) PCT No.: PCT/CN2017/071319
§ 371 (c)(1),
(2) Date: May 15, 2018

(87) PCT Pub. No.: WO2017/084642
PCT Pub. Date: May 26, 2017

(65) Prior Publication Data
US 2020/0328964 A1  Oct. 15, 2020

(30) Foreign Application Priority Data
Nov. 17, 2015 (CN) .......................... 201510791418.3

(51) Int. Cl.
*H04L 12/715* (2013.01)
*H04L 12/26* (2006.01)
(Continued)

(52) U.S. Cl.
CPC ............ *H04L 45/04* (2013.01); *H04L 43/062* (2013.01); *H04L 45/70* (2013.01); *H04L 47/2441* (2013.01)

(58) Field of Classification Search
None
See application file for complete search history.

(56) References Cited

U.S. PATENT DOCUMENTS 8,391,303 B2    3/2013  Li
8,724,487 B1 *  5/2014  Aitken .................... H04L 43/04
                                                                 370/252
(Continued)

FOREIGN PATENT DOCUMENTS

CN    101510829 A    8/2009
CN    102082734 A    6/2011
(Continued)

OTHER PUBLICATIONS

International Search Report in international application No. PCT/CN2017/071319, dated Mar. 14, 2017.
(Continued)

*Primary Examiner* — Anh Vu H Ly
(74) *Attorney, Agent, or Firm* — BakerHostetler

(57) ABSTRACT

A method and device for collecting a traffic flow value of a BGP community attribute or BGP extended community attribute are provided. The method comprises: at least one of BGP community attribute information or BGP extended community attribute information corresponding to a traffic flow is obtained according to a traffic flow reporting instruction, and at least one of the obtained BGP community attribute information or BGP extended community attribute information is reported to a second device through a traffic flow reporting protocol.

16 Claims, 8 Drawing Sheets

(51) Int. Cl.
*H04L 12/721* (2013.01)
*H04L 12/851* (2013.01)

(56) References Cited

U.S. PATENT DOCUMENTS

| | | |
|---|---|---|
| 8,954,491 B1 | 2/2015 | Medved et al. |
| 9,026,674 B1* | 5/2015 | Kanna .................. H04L 43/04 709/242 |
| 9,614,763 B2* | 4/2017 | Dong .................... H04L 45/745 |
| 10,135,683 B1 | 11/2018 | Medved et al. |
| 2008/0170578 A1* | 7/2008 | Ould-Brahim ...... H04L 12/4641 370/401 |
| 2010/0046377 A1* | 2/2010 | Ryan .................. H04L 41/0681 370/241 |
| 2010/0265956 A1 | 10/2010 | Li |
| 2012/0254465 A1* | 10/2012 | Papadimitriou ........ H04L 45/14 709/242 |
| 2013/0121340 A1* | 5/2013 | Papadimitriou ........ H04L 45/02 370/410 |
| 2014/0303934 A1* | 10/2014 | Mylarappa .......... G06F 11/3495 702/186 |
| 2015/0215183 A1* | 7/2015 | Bucci ..................... H04L 43/08 370/252 |
| 2016/0218951 A1* | 7/2016 | Vasseur ................. H04L 43/022 |

FOREIGN PATENT DOCUMENTS

| | | |
|---|---|---|
| CN | 103840998 A | 6/2014 |
| JP | 2008219685 A | 9/2008 |
| JP | 4860745 B2 | 1/2012 |

OTHER PUBLICATIONS

English Translation of the Written Opinion of the International Search Authority in international application No. PCT/CN2017/071319, dated Mar. 14, 2017.
Extended Search Report issued in European Application No. 17724304.5, dated Jan. 22, 2019.
Phaal et al., "InMon Corporation's sFlow: A Method for Monitoring Traffic in Switched and Routed Networks" The Internet Society, Network Working Group, XP055668784, Sep. 2001, 31 Pages; Retrieved from the Internet: URL:https://www.rfc-editor.org/rfc/pdfrfc/rfc3176.txt.pdf [retrieved on Feb. 14, 2020].
Office Action issued in European Application No. 17724304.5, dated Feb. 20, 2020.

* cited by examiner

METHOD AND DEVICE FOR COLLECTING TRAFFIC FLOW VALUE OF BGP COMMUNITY ATTRIBUTE OR BGP EXTENDED COMMUNITY ATTRIBUTE

CROSS-REFERENCE TO RELATED APPLICATIONS

The present application is a National Stage of International Patent Application No. PCT/CN2017/071319, filed Jan. 16, 2017, and claims priority to Chinese Patent Application No. 201510791418.3, filed on Nov. 17, 2015, the contents of which are hereby incorporated by reference in their entirety.

TECHNICAL FIELD

The disclosure relates to the technical field of communications, and particularly to a method and device for collecting a traffic flow value of a Border Gateway Protocol (BGP) community attribute or BGP extended community attribute.

BACKGROUND

Network planning, operation and maintenance, optimization and the like all require acquisition and analysis of a traffic flow in a network and its traffic flow direction. As shown in FIG. 1, if a router is correspondingly configured, the router may determine a traffic flow according to a configuration and report a determining result to a specified server when forwarding the traffic flow, and the server performs further analysis, report rendering and the like on the reported traffic flow. At present, a standardized traffic flow reporting protocol is Internet Protocol Flow Information Export (IPFIX), and private reporting protocols of manufacturers are also widely deployed in an existing network, for example, netstream of Huawei, netflow of Cisco and JFlow of Juniper.

When network traffic flows are balanced, it is necessary to regulate a part of the traffic flows from a main path with a relatively high utilization rate to a roundabout path with a relatively low utilization rate to make utilization rates of all paths relatively balanced, as shown in FIG. 2. If the traffic flows are regulated according to routing network segments, a granularity is too small, and it is necessary to regulate traffic flows corresponding to multiple routing network segments; and if the traffic flows are regulated according to an Autonomous System (AS), the granularity is too large, and the utilization rate of the roundabout path may usually be too high after regulation. It is usually more appropriate to perform regulation according to a granularity of a BGP community attribute or a BGP extended community attribute. However, performing traffic flow regulation according to the granularity of the BGP community attribute or the BGP extended community attribute requires analysis over a traffic flow corresponding to the BGP community attribute or the BGP extended community attribute. A present traffic flow reporting protocol (including a standard IPFIX protocol and private protocols of manufacturers) may only report the traffic flows corresponding to the network segments and the AS, and may not directly report the traffic flow corresponding to the BGP community attribute or the BGP extended community attribute. This requires further analysis processing of a traffic flow analysis server.

For analyzing a traffic flow corresponding to a BGP community attribute or a BGP extended community attribute, a traffic flow analysis server is required to learn a BGP routing protocol (the BGP routing protocol is a very complicated routing protocol, and its implementation has a very high requirement on a function of the traffic flow analysis server) from a router, and is required to perform BGP routing table lookup and the like with received traffic flow information (because the traffic flow analysis server is required to process a reported traffic flow in a centralized manner and a BGP routing table is usually very large, rapidly looking up the BGP routing table to obtain corresponding BGP community attribute or BGP extended community attribute information has a very high requirement on performance of the traffic flow analysis server). This makes very high requirements on both the function and performance of the traffic flow analysis server.

SUMMARY

The technical problem to be solved by embodiments of the disclosure is to provide a method and device for collecting a traffic flow value of a BGP community attribute or extended community attribute, so as to solve a problem about collecting of the traffic flow value corresponding to the BGP community attribute or the BGP extended community attribute by a traffic flow analysis server in a conventional art.

In order to solve the technical problem, the technical solutions of the disclosure are implemented as follows.

According to an aspect of the embodiments of the disclosure, a method for collecting a traffic flow value of a BGP community attribute or extended community attribute is provided, which may be applied to a first device, the method may comprise that:

at least one of BGP community attribute information or BGP extended community attribute information corresponding to a traffic flow are/is obtained according to a traffic flow reporting instruction: and at least one of the obtained BGP community attribute information or BGP extended community attribute information are/is reported to a second device through a traffic flow reporting protocol.

Furthermore, the step that at least one of the BGP community attribute information or BGP extended community attribute information corresponding to the traffic flow are/is obtained according to the traffic flow reporting instruction comprises at least one of the following:

BGP community attribute information corresponding to a corresponding address of the traffic flow is obtained according to a type of BGP community attribute information required to be reported, or BGP extended community attribute information corresponding to a corresponding address of the traffic flow is obtained according to a type of BGP extended community attribute information required to be reported, wherein, when the BGP community attribute information required to be reported is BGP community attribute information corresponding to a source address of the traffic flow, the corresponding address may be the source address:

when the BGP community attribute information required to be reported is BGP community attribute information corresponding to a destination address of the traffic flow, the corresponding address may be the destination address:

when the BGP community attribute information required to be reported is the BGP community attribute information corresponding to the source address of the traffic flow and the BGP community attribute information corresponding to the destination address of the traffic flow, the corresponding address may be the source address and the destination address:

when the BGP extended community attribute information required to be reported is BGP extended community attribute information corresponding to the source address of the traffic flow, the corresponding address may be the source address;

when the BGP extended community attribute information required to be reported is BGP extended community attribute information corresponding to the destination address of the traffic flow, the corresponding address may be the destination address; and when the BGP extended community attribute information required to be reported is the BGP extended community attribute information corresponding to the source address of the traffic flow and the BGP extended community attribute information corresponding to the destination address of the traffic flow, the corresponding address may be the source address and the destination address.

Furthermore, the step that at least one of the BGP community attribute information or the BGP extended community attribute information corresponding to the corresponding address of the traffic flow is obtained according to at least one of the type of the BGP community attribute information required to be reported or the type of the BGP extended community attribute information required to be reported may comprise that:

at least one of address information corresponding to the type of the BGP community attribute information required to be reported or address information corresponding to the type of the BGP extended community attribute information required to be reported is/are acquired according to at least one of the type of the BGP community attribute information required to be reported, or the type of the BGP extended community attribute information required to be reported;

a BGP route corresponding to the address information is determined; and at least one of the corresponding BGP community attribute information or BGP extended community attribute information are/is obtained from the determined BGP route.

Furthermore, the step that at least one of the obtained BGP community attribute information or BGP extended community attribute information are/is reported to the second device through the traffic flow reporting protocol may comprise that:

at least one of the obtained BGP community attribute information or BGP extended community attribute information are/is reported to the second device through one or more Information Elements (IEs) defined to report at least one of the BGP community attribute information or the BGP extended community attribute information in the traffic flow reporting protocol, wherein the one or more IEs may comprise at least one of: a first IE defined to report the BGP community attribute information corresponding to the source address of the traffic flow, a second IE defined to report the BGP community attribute information corresponding to the destination address of the traffic flow, a third IE defined to report the BGP extended community attribute information corresponding to the source address of the traffic flow or a fourth IE defined to report the BGP extended community attribute information corresponding to the destination address of the traffic flow.

Furthermore, the step that at least one of the obtained BGP community attribute information or BGP extended community attribute information are/is reported to the second device through the one or more IEs defined to report at least one of the BGP community attribute information or the BGP extended community attribute information in the traffic flow reporting protocol may comprise at least one of:

the obtained BGP community attribute information of the source address of the traffic flow is encapsulated in the first IE, and the first IE is reported to the second device;

the obtained BGP community attribute information of the destination address of the traffic flow is encapsulated in the second IE, and the second IE is reported to the second device;

the obtained BGP extended community attribute information of the source address of the traffic flow is encapsulated in the third IE, and the third IE is reported to the second device;

or, the obtained BGP extended community attribute information of the destination address of the traffic flow is encapsulated in the fourth IE, and the fourth IE is reported to the second device.

The embodiments of the disclosure provide a method for collecting a traffic flow value of a BGP community attribute or BGP extended community attribute, which may be applied to a second device, the method may comprise that:

at least one of BGP community attribute information or BGP extended community attribute information reported through a traffic flow reporting protocol are/is received; and at least one of a traffic flow value corresponding to the BGP community attribute information or a traffic flow value corresponding to the BGP extended community attribute information is/are determined according to at least one of the received BGP community attribute information, or the received BGP extended community attribute information.

Furthermore, the step that at least one of the BGP community attribute information or BGP extended community attribute information reported through the traffic flow reporting protocol are/is received may comprise that:

at least one of the following Information Elements (IEs) in the traffic flow reporting protocol is received:

a first IE encapsulated with BGP community attribute information corresponding to a source address of a traffic flow, a second IE encapsulated with BGP community attribute information corresponding to a destination address of the traffic flow, a third IE encapsulated with BGP extended community attribute information corresponding to the source address of the traffic flow, or a fourth IE encapsulated with BGP extended community attribute information corresponding to the destination address of the traffic flow; and at least one of the BGP community attribute information or BGP extended community attribute are/is obtained in at least one of the following ways:

the BGP community attribute information corresponding to the source address of the traffic flow is obtained from the first IE, the BGP community attribute information corresponding to the destination address of the traffic flow is obtained from the second IE, the BGP extended community attribute information corresponding to the source address of the traffic flow is obtained from the third IE, or, the BGP extended community attribute information corresponding to the destination address of the traffic flow is obtained from the fourth IE.

Furthermore, the step that at least one of the traffic flow value corresponding to the BGP community attribute information or the traffic flow value of the BGP extended community attribute information is/are determined according to at least one of the received BGP community attribute information or the received BGP extended community attribute information may comprise at least one of the following:

a traffic flow value corresponding to the BGP community attribute information corresponding to the source address of the traffic flow is determined according to the BGP community attribute information corresponding to the source address of the traffic flow, and a traffic flow value corresponding to the BGP community attribute information corresponding to the destination address of the traffic flow is determined according to the BGP community attribute information corresponding to the destination address of the traffic flow:

or, a traffic flow value corresponding to the BGP extended community attribute information corresponding to the source address of the traffic flow is determined according to the BGP extended community attribute information corresponding to the source address of the traffic flow, and a traffic flow value corresponding to the BGP extended community attribute information corresponding to the destination address of the traffic flow is determined according to the BGP extended community attribute information corresponding to the destination address of the traffic flow.

The embodiments of the disclosure further provide a first device, which may comprise:

an obtaining module, configured to obtain at least one of BGP community attribute information or BGP extended community attribute information of a traffic flow according to a traffic flow reporting instruction; and a reporting module, configured to report at least one of the obtained BGP community attribute information or BGP extended community attribute information to a second device through a traffic flow reporting protocol.

Furthermore, the obtaining module may comprise:

a first obtaining unit, configured to obtain at least one of BGP community attribute information or BGP extended community attribute information corresponding to a corresponding address of the traffic flow according to at least one of a type of BGP community attribute information required to be reported, or a type of BGP extended community attribute information required to be reported, wherein, when the BGP community attribute information required to be reported is BGP community attribute information corresponding to a source address of the traffic flow, the corresponding address may be the source address:

when the BGP community attribute information required to be reported is BGP community attribute information corresponding to a destination address of the traffic flow, the corresponding address may be the destination address;

when the BGP community attribute information required to be reported is the BGP community attribute information corresponding to the source address of the traffic flow and the BGP community attribute information corresponding to the destination address of the traffic flow, the corresponding address may be the source address and the destination address;

when the BGP extended community attribute information required to be reported is BGP extended community attribute information corresponding to the source address of the traffic flow, the corresponding address may be the source address;

when the BGP extended community attribute information required to be reported is BGP extended community attribute information corresponding to the destination address of the traffic flow, the corresponding address may be the destination address; and when the BGP extended community attribute information required to be reported is the BGP extended community attribute information corresponding to the source address of the traffic flow and the BGP extended community attribute information corresponding to the destination address of the traffic flow, the corresponding address may be the source address and the destination address.

Furthermore, the first obtaining unit may comprise:

an acquisition subunit, configured to acquire at least one of address information corresponding to the type of the BGP community attribute information required to be reported or address information corresponding to the type of the BGP extended community attribute information required to be reported according to at least one of the type of the BGP community attribute information required to be reported, or the type of the BGP extended community attribute information required to be reported;

a determination subunit, configured to determine a BGP route corresponding to the address information; and a obtaining subunit, configured to obtain at least one of the corresponding BGP community attribute information or BGP extended community attribute information from the determined BGP route.

Furthermore, the reporting module may comprise:

a reporting unit, configured to report at least one of the obtained BGP community attribute information or BGP extended community attribute information to the second device through one or more IEs defined to report at least one of the BGP community attribute information or the BGP extended community attribute information in the traffic flow reporting protocol, wherein the one or more IEs may comprise at least one of: a first IE defined to report the BGP community attribute information corresponding to the source address of the traffic flow, a second IE defined to report the BGP community attribute information corresponding to the destination address of the traffic flow, a third IE defined to report the BGP extended community attribute information corresponding to the source address of the traffic flow or a fourth IE defined to report the BGP extended community attribute information corresponding to the destination address of the traffic flow.

Furthermore, the reporting unit may comprise:

an encapsulation subunit, configured to implement at least one of encapsulate the obtained BGP community attribute information of the source address of the traffic flow in the first IE, encapsulate the obtained BGP community attribute information of the destination address of the traffic flow in the second IE, encapsulate the obtained BGP extended community attribute information of the source address of the traffic flow in the third IE, or, encapsulate the obtained BGP extended community attribute information of the destination address of the traffic flow in the fourth IE; and a reporting subunit, configured to report at least one of the first IE, the second IE, the third IE or the fourth IE to the second device.

The embodiments of the disclosure further provide a second device, which may comprise:

a receiving module, configured to receive at least one of BGP community attribute information or BGP extended community attribute information reported through a traffic flow reporting protocol; and a determination module, configured to determine at least one of a traffic flow value corresponding to the BGP community attribute information or a traffic flow value corresponding to the BGP extended community attribute information according to at least one of the received BGP community attribute information, or the received BGP extended community attribute information.

Furthermore, the receiving module may comprise:

a receiving unit, configured to receive at least one of the following Information Elements (IEs) in the traffic flow reporting protocol: a first IE encapsulated with BGP community attribute information corresponding to a source address of a traffic flow, a second IE encapsulated with BGP community attribute information corresponding to a destination address of the traffic flow, a third IE encapsulated with BGP extended community attribute information corresponding to the source address of the traffic flow, or a fourth IE encapsulated with BGP extended community attribute information corresponding to the destination address of the traffic flow; and a second obtaining unit, configured to implement at least one of the following: obtain the BGP community attribute information corresponding to the source address of the traffic flow from the first IE, obtain the BGP community attribute information corresponding to the destination address of the traffic flow from the second IE, obtain the BGP extended community attribute information corresponding to the source address of the traffic flow from the third IE, or, obtain the BGP extended community attribute information corresponding to the destination address of the traffic flow from the fourth IE.

Furthermore, the determination module may comprise:

a determination unit, configured to implement at least one of the following: determine a traffic flow value corresponding to the BGP community attribute information corresponding to the source address of the traffic flow according to the BGP community attribute information corresponding to the source address of the traffic flow, and determine a traffic flow value corresponding to the BGP community attribute information corresponding to the destination address of the traffic flow according to the BGP community attribute information corresponding to the destination address of the traffic flow; or, determine a traffic flow value corresponding to the BGP extended community attribute information corresponding to the source address of the traffic flow according to the BGP extended community attribute information corresponding to the source address of the traffic flow, and determine a traffic flow value corresponding to the BGP extended community attribute information corresponding to the destination address of the traffic flow according to the BGP extended community attribute information corresponding to the destination address of the traffic flow.

The disclosure has the following beneficial effects.

In the technical solutions, the traffic flow reporting protocol is extended, the BGP community attribute information or BGP extended community attribute information corresponding to the traffic flow may be directly reported through the extended traffic flow reporting protocol, and then the second device may directly determine the traffic flow value corresponding to the BGP community attribute information or the BGP extended community attribute information, is not required to learn the BGP route, and is also not required to execute operations of BGP table lookup and the like according to reported traffic flow information, so that requirements on a function and performance of the second device are greatly reduced. Meanwhile, all BGP community attribute information or BGP extended community attribute information corresponding to the traffic flow may be reported to the second device through the extended traffic flow reporting protocol, and it is unnecessary to specify the BGP community attribute information or BGP extended community attribute information to be determined and reported, so that a requirement of an application market may be met better.

DETAILED DESCRIPTION

Figure 1:
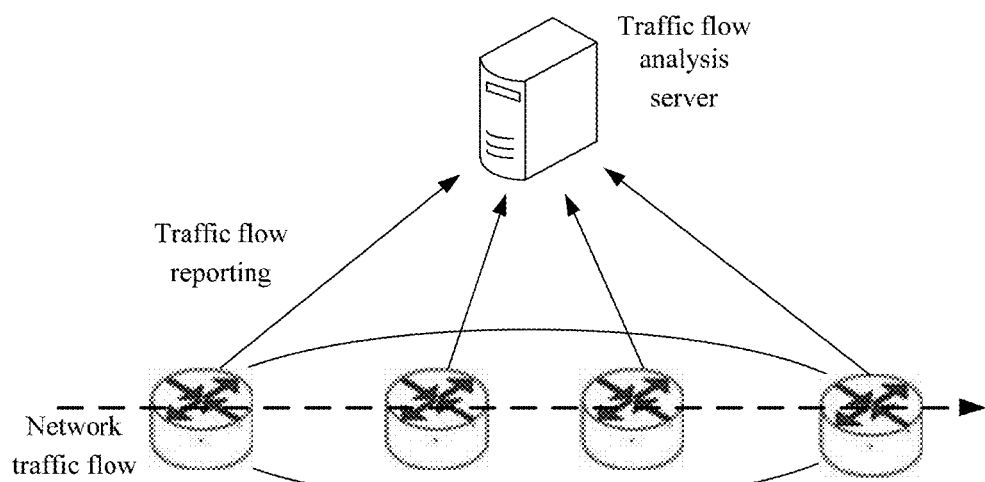
FIG. 1 is a first structure diagram of a network according to the conventional art.

Exemplary embodiments of the disclosure will be described below with reference to the drawings in more detail. Although the exemplary embodiments of the disclosure are shown in the drawings, it should be understood that the disclosure may be implemented in various forms and should not be limited by the embodiments elaborated herein. On the contrary, these embodiments are provided to make the disclosure understood more thoroughly and completely deliver the scope of the disclosure to those skilled in the art.

First Embodiment

Figure 3:
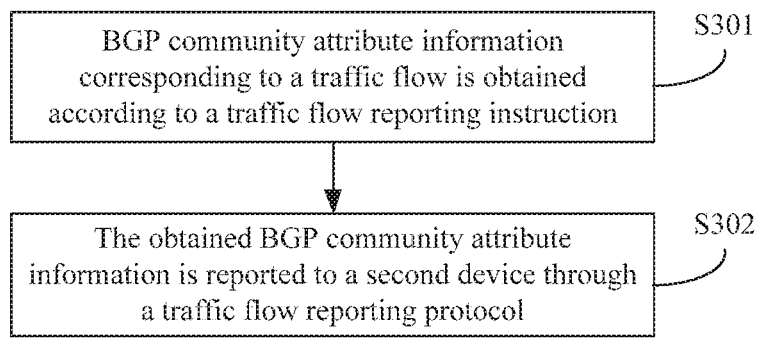
FIG. 3 is a first flowchart of a method for collecting a traffic flow value corresponding to a BGP community attribute according to a first embodiment of the disclosure.
Figure 4:
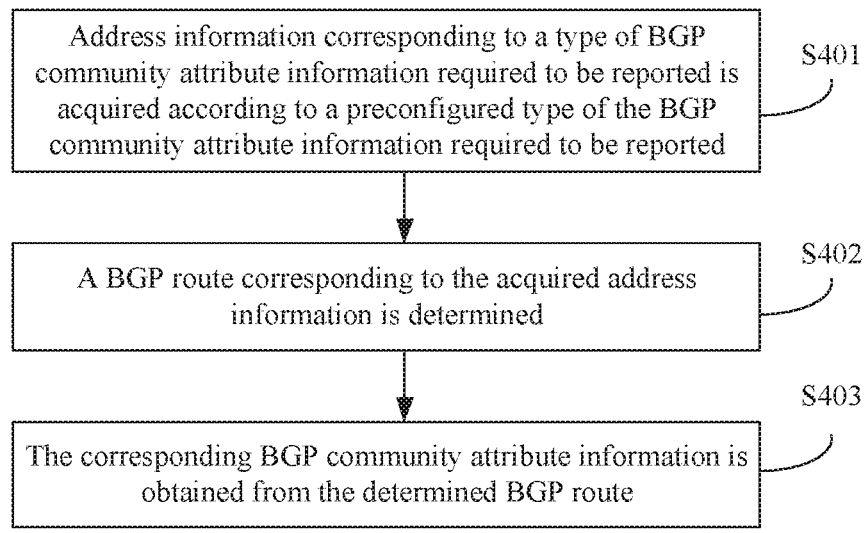
FIG. 4 is a second flowchart of a method for collecting a traffic flow value corresponding to a BGP community attribute according to a first embodiment of the disclosure.

The embodiment of the disclosure provides a method for collecting a traffic flow value corresponding to a BGP community attribute, which is applied to a first device. Referring to FIG. 3, the method comprises the following steps.

In S301, BGP community attribute information of a traffic flow is obtained according to a configured or transmitted traffic flow reporting instruction.

Herein, for the first device if the BGP community attribute information corresponding to the traffic flow is required to be reported, when the traffic flow passes, the corresponding BGP community attribute information is obtained according to the traffic flow reporting instruction.

Specifically, the first device may be a router, a 3-layer switch, a server, a dedicated traffic flow collecting device and the like.

In S302, the obtained BGP community attribute information is reported to a second device through a traffic flow reporting protocol.

The "traffic flow reporting protocol" in the step is a protocol obtained by extending an IPFIX protocol or private protocols of some manufacturers such as netstream and netflow in the conventional art. A field or IE defined to report the BGP community attribute information is added in the traffic flow reporting protocol in the conventional art to extend the traffic flow reporting protocol, so that the first device contains the BGP community attribute information corresponding to the traffic flow in reported traffic flow information.

Figure 2:
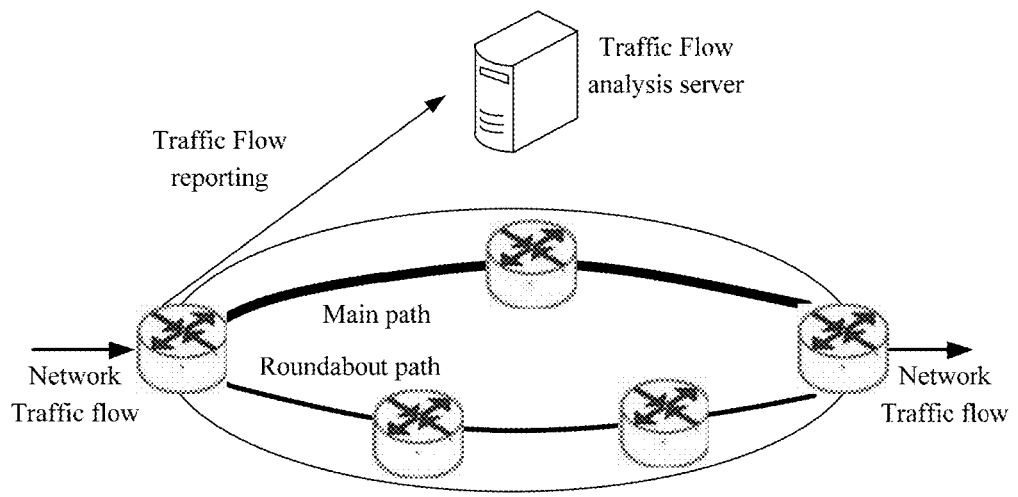
FIG. 2 is a second structure diagram of a network according to the conventional art.

Herein, the second device may be a server with a traffic flow processing or analysis function, and for example, may be a traffic flow analysis server shown in FIG. 1 and FIG. 2, and of course, may also be an entity of another form, which will not be exhausted in the embodiment.

From the above, according to the technical solution provided by the embodiment of the disclosure, the traffic flow reporting protocol is extended, all BGP community attribute information may be directly reported through the extended traffic flow reporting protocol, and then the second device may directly collect a traffic flow value corresponding to the BGP community attribute information, is not required to learn a BGP route, and is also not required to execute operations of BGP table lookup and the like according to the reported traffic flow information, so that requirements on a function and performance of the second device are greatly reduced. Meanwhile, all the BGP community attribute information may be reported to the second device through the extended traffic flow reporting protocol, so that a requirement of an application market may be met better.

Specifically, not only is whether to report the BGP community attribute information corresponding to the traffic flow or not preconfigured, but also a type of the BGP community attribute information required to be reported may also be preconfigured. When the traffic flow passes. BGP community attribute information of a corresponding address of the traffic flow is obtained according to the preconfigured type of the BGP community attribute information required to be reported.

Herein, the type of the BGP community attribute information at least includes: BGP community attribute information corresponding to a source address of the traffic flow and BGP community attribute information corresponding to a destination address of the traffic flow.

When the preconfigured BGP community attribute information required to be reported is the BGP community attribute information corresponding to the source address of the traffic flow, the abovementioned "corresponding address" is the source address;

when the preconfigured BGP community attribute information required to be reported is the BGP community attribute information corresponding to the destination address of the traffic flow, the abovementioned "corresponding address" is the destination address; and when the preconfigured BGP community attribute information required to be reported is the BGP community attribute information corresponding to the source address of the traffic flow and the BGP community attribute information corresponding to the destination address of the traffic flow, the abovementioned "corresponding address" is the source address and the destination address.

That is, it may be configured that only the BGP community attribute information corresponding to the source address of the traffic flow is reported, or it is configured that only the BGP community attribute information corresponding to the destination address of the traffic flow is reported, or it is configured that the BGP community attribute information corresponding to the source address and destination address of the traffic flow is simultaneously reported.

Specifically, the first device obtains the BGP community attribute information of the corresponding address of the traffic flow according to the preconfigured type of the BGP community attribute information required to be reported in the following specific implementation manner.

In S401, address information corresponding to the type of the BGP community attribute information required to be reported is acquired according to the preconfigured type of the BGP community attribute information required to be reported.

That is, if the BGP community attribute information required to be reported is the BGP community attribute information corresponding to the source address of the traffic flow, source address information of the traffic flow is acquired; and if the BGP community attribute information required to be reported is the BGP community attribute information corresponding to the destination address of the traffic flow, destination address information of the traffic flow is acquired.

In S402, a BGP route corresponding to the acquired address information is determined.

Herein, a BGP routing table or a data structure generated by the BGP routing table and more convenient for acquiring of the community attribute information may be acquired according to the source address or destination address of the traffic flow to determine the BGP route corresponding to the source address or the destination address.

In S403, the corresponding BGP community attribute information is obtained from the determined BGP route.

After the BGP route corresponding to the source address or destination address of the traffic flow is determined, the community attribute information may be extracted from the corresponding BGP route, and then the obtained community attribute information is added into corresponding related information of the traffic flow for reporting to the second device.

Herein, if a traffic flow sampled by a router is not a new traffic flow, the BGP routing table (or the data structure generated by the BGP routing table and more convenient for acquiring of the community attribute information) is not required to be acquired again because community attribute information corresponding to this traffic flow has been found and stored in the related information of the traffic flow during establishment as a new traffic flow.

Herein, the operation of looking up the BGP routing table for the community attribute information may be completed together with another operation of looking up the BGP routing table to improve efficiency. For example, when AS information corresponding to the source address of the traffic flow is reported, the BGP routing table is also required to be looked up according to the source address of the traffic flow to obtain a BGP route corresponding to the source address, and at this moment, the AS information and the community attribute information may be directly extracted from the BGP route and stored in the related information of the traffic flow respectively.

Specifically, after the BGP community attribute information of the traffic flow is obtained, during flow reporting, the obtained BGP community attribute information may be reported to the second device through the traffic flow reporting protocol, and a specific implementation way is as follows: the obtained BGP community attribute information is reported to the second device through an IE defined to report the BGP community attribute information in the traffic flow reporting protocol.

Herein, the IE at least includes: a first IE defined to report the BGP community attribute information corresponding to the source address of the traffic flow and a second IE defined to report the BGP community attribute information corresponding to the destination address of the traffic flow.

Figure 5:
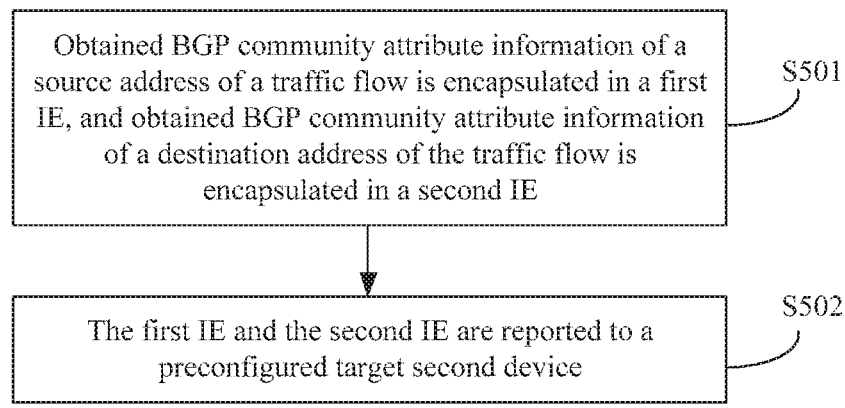
FIG. 5 is a third flowchart of a method for collecting a traffic flow value corresponding to a BGP community attribute according to a first embodiment of the disclosure.

Specifically, referring to FIG. 5, a specific implementation manner for reporting the obtained BGP community attribute information to the second device through the IE defined to report the BGP community attribute information in the traffic flow reporting protocol includes the following steps.

In S501, the obtained BGP community attribute information of the source address of the traffic flow is encapsulated in the first IE, and the obtained BGP community attribute information of the destination address of the traffic flow is encapsulated in the second IE.

For reporting the obtained BGP community attribute information of the traffic flow to the second device, in the embodiment of the disclosure, two IEs are preferably added into the traffic flow reporting protocol: the first IE defined to report the BGP community attribute information corresponding to the source address of the traffic flow and the second IE defined to report the BGP community attribute information corresponding to the destination address of the traffic flow.

During traffic flow reporting, the BGP community attribute information corresponding to the source address of the traffic flow is encapsulated in the first IE and the BGP community attribute information corresponding to the destination address of the traffic flow is encapsulated in the second IE so as to report this information to the second device. Then, the second device is not required to learn the BGP route, and is also not required to execute the operations of BGP table lookup and the like according to the reported traffic flow information, so that the requirements on the function and performance of the second device are greatly reduced.

In S502, the first IE and the second IE are reported to the second device.

Herein, for the first device configured to collect and report the traffic flow, a traffic flow analysis server(s) to which the reporting is directed may be preconfigured, that is, the target second equipment for receiving the flow reporting may be preconfigured.

For further understanding the first IE and the second IE, further explanations and descriptions will be made below.

A purpose of extending the traffic flow reporting protocol, namely adding the IE in the traffic flow reporting protocol, is to ensure that the traffic flow information reported by the first device contains the BGP community attribute information corresponding to the traffic flow.

Specifically, the standard IPFIX protocol may be extended, and the private protocols such as netstream and netflow of some manufacturers may also be similarly extended.

In the embodiment of the disclosure, three new IEs are defined, i.e., bgpCommunity (BGP community attribute), bgpSourceCommunityList (BGP source community attribute list) and bgpDestinationCommunityList (BGP destination community attribute list), to report the community attribute information of BGP routes corresponding to the source address and destination address of the traffic flow. Of course, it can be understood that the three new IEs may also be in another form, as long as they may be configured to report the community attribute information of the BGP routes corresponding to the source address and destination address of the traffic flow.

Wherein, Table 1 shows specifications about specific information contents of the two IEs bgpSourceCommunityList and bgpDestinationCommunity List, comprising: information such as an element Identifier (ID), a name, a data type, data type semantics, a description and a unit. When obtaining the BGP community attribute information, the router may perform corresponding content filling and reports it to the second device, and the second device may also parse the corresponding contents (in Table 1, IANA is the Internet Assigned Numbers Authority). Of course this is only an example, and the contents in Table 1 may be reduced, or added or changed according to a requirement under a practical condition. Each element in bgpSourceCommiunity List and bgpDestinationCommunityList is a specific BGP community, and its format is specified by the newly defined bgpCommunity IE as shown in Table 2.

TABLE 1

| Element ID | Name | Data Type | Data Type Semantics | Description | Units |
| --- | --- | --- | --- | --- | --- |
| Allocated by the IANA after standardization | bgpSourceCommunityList | basicList (defined by RFC6313) | List | BGP community attribute information corresponding to the source address of the related traffic flow | NULL |

TABLE 1-continued

| Element ID | Name | Data Type | Data Type Semantics | Description | Units |
|---|---|---|---|---|---|
| Allocated by the IANA after standardization | bgpDestinationCommunityList | basicList (defined by RFC6313) | List | BGP community attribute information corresponding to the destination address of the related traffic flow | NULL |

TABLE 2

| Element ID | Name | Data Type | Data Type Semantics | Description | Units |
|---|---|---|---|---|---|
| Allocated by the IANA after standardization | bgpCommunity | unsigned32 (32-bit unsigned integer) | identifier | BGP community attribute defined in RFC1997 | NULL |

From the above, according to the technical solution provided by the embodiment of the disclosure, the traffic flow reporting protocol is extended, the new field or IE is added in the traffic flow reporting protocol, then the first device may directly report the BGP community attribute information, and the second device may directly collect the traffic flow value corresponding to the BGP community attribute information, is not required to learn the BGP route, and is also not required to execute the operations of BGP table lookup and the like according to the reported traffic flow information, so that the requirements on the function and performance of the second device are greatly reduced. In addition, since the second device may directly collect the traffic flow value corresponding to the BGP community attribute information in the solution, network traffic flows may be conveniently regulated for balancing, a source and destination of the traffic flow may be simultaneously considered for accurate scheduling, for example, a starting point for traffic flow scheduling may be regulated to be appropriately close to a source point of the traffic flow according to collecting information of the source, and the requirement of the application market may be met better.

Second Embodiment

Figure 6:
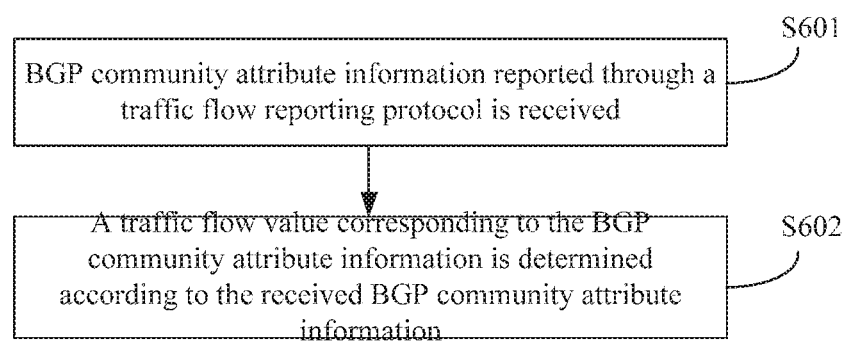
FIG. 6 is a first flowchart of a method for collecting a traffic flow value corresponding to a BGP community attribute according to a second embodiment of the disclosure.

The embodiment of the disclosure provides a method for collecting a traffic flow value corresponding to a BGP community attribute, which is applied to a second device side. Referring to FIG. 6, the method comprises the following steps.

In S601, BGP community attribute information reported through a traffic flow reporting protocol is received.

The "traffic flow reporting protocol" in the step is a protocol obtained by extending an IPFIX protocol or private protocols of some manufacturers such as netstream and netflow in the conventional art. A field or IE defined to report the BGP community attribute information is added in the traffic flow reporting protocol in the conventional art to extend the traffic flow reporting protocol, so that the first device contains BGP community attribute information corresponding to a traffic flow in reported traffic flow information.

In S602, a traffic flow value corresponding to the BGP community attribute information is determined according to the received BGP community attribute information.

That is, the traffic flow analysis server may collect the traffic flow value corresponding to the BGP community attribute information for traffic flow collecting according to the received BGP community attribute information.

Figure 7:
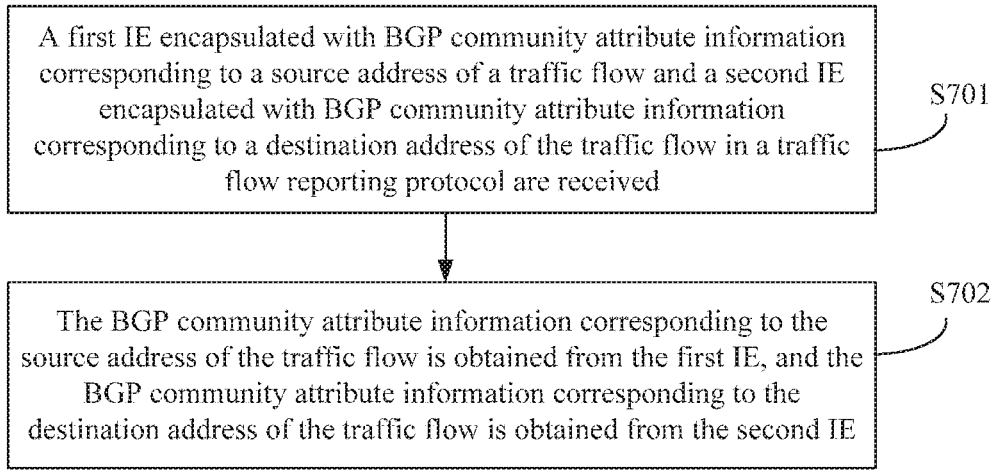
FIG. 7 is a second flowchart of a method for collecting a traffic flow value corresponding to a BGP community attribute according to a second embodiment of the disclosure.

Specifically, referring to FIG. 7, the second device receives the BGP community attribute information reported through the traffic flow reporting protocol in the following specific implementation manner.

In S701, a first IE encapsulated with BGP community attribute information corresponding to a source address of a traffic flow and a second IE encapsulated with BGP community attribute information corresponding to a destination address of the traffic flow in the traffic flow reporting protocol are received.

For reporting the obtained BGP community attribute information of the traffic flow to the second device, in the embodiment of the disclosure, two IEs are preferably added into the traffic flow reporting protocol: the first IE defined to report the BGP community attribute information corresponding to the source address of the traffic flow and the second IE defined to report the BGP community attribute information corresponding to the destination address of the traffic flow.

During traffic flow reporting by the first device, the BGP community attribute information corresponding to the source address of the traffic flow is encapsulated in the first IE and the BGP community attribute information corresponding to the destination address of the traffic flow is encapsulated in the second IE for reporting to the second device. Then, the second device is not required to learn a BGP route, and is also not required to execute operations of BGP table lookup and the like according to reported traffic flow information, so that requirements on a function and performance of the second device are greatly reduced.

In S702, the BGP community attribute information corresponding to the source address of the traffic flow is obtained from the first IE, and the BGP community attribute information corresponding to the destination address of the traffic flow is obtained from the second IE.

After receiving the first IE and the second IE, the second device may extract the corresponding BGP community attribute information therefrom for further analysis and processing.

Furthermore, the second device may determine a traffic flow value corresponding to the BGP community attribute information corresponding to the source address of the traffic flow according to the BGP community attribute information corresponding to the source address of the traffic flow and determine a traffic flow value corresponding to the BGP community attribute information corresponding to the destination address of the traffic flow according to the BGP community attribute information corresponding to the destination address of the traffic flow for further traffic flow collecting.

From the above, according to the technical solution provided by the embodiment of the disclosure, the traffic flow reporting protocol is extended, the BGP community attribute information corresponding to the traffic flow may be directly reported through the extended traffic flow reporting protocol, and then the second device may directly collect the traffic flow value corresponding to the BGP community attribute information, is not required to learn a BGP route, and is also not required to execute operations of BGP table lookup and the like according to reported traffic flow information, so that the requirements on the function and performance of the second device are greatly reduced. Meanwhile, all the BGP community attribute information corresponding to the traffic flow may be reported to the second device through the extended traffic flow reporting protocol, so that a requirement of an application market may be met better.

Third Embodiment

Figure 8:
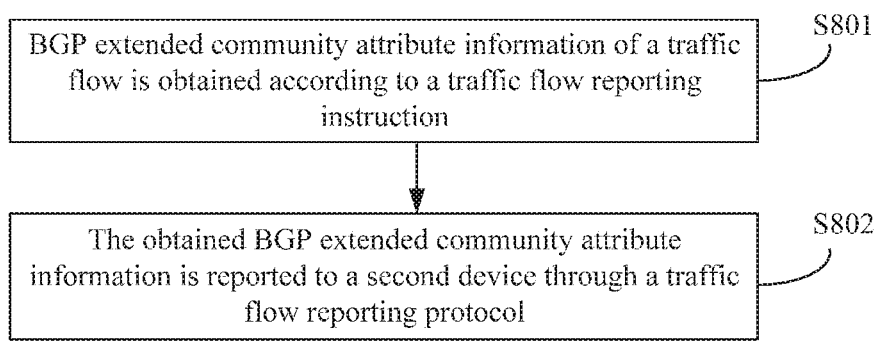
FIG. 8 is a first flowchart of a method for collecting a traffic flow value corresponding to a BGP extended community attribute according to a third embodiment of the disclosure.
Figure 9:
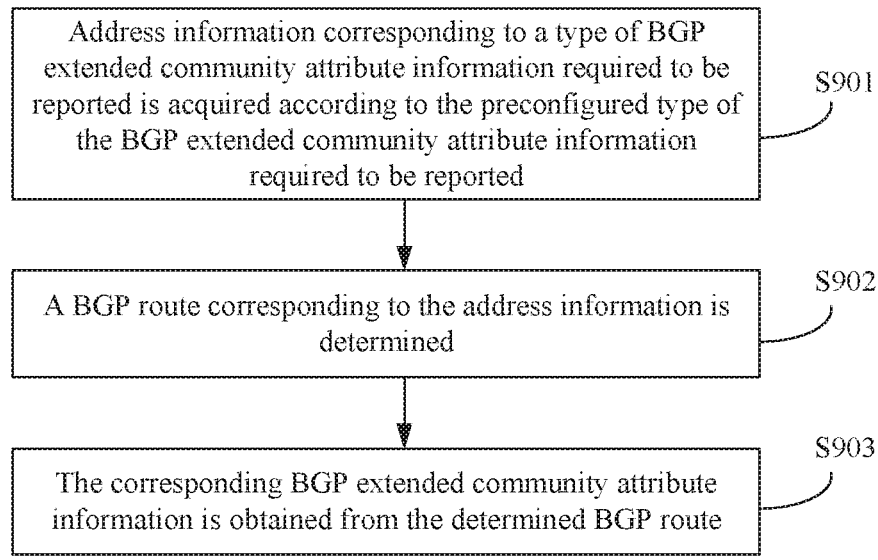
FIG. 9 is a second flowchart of a method for collecting a traffic flow value corresponding to a BGP extended community attribute according to a third embodiment of the disclosure.

Subsequent descriptions are made in the embodiment of the disclosure with processing for BGP extended community attribute information as an example. A method for collecting a traffic flow value corresponding to a BGP extended community attribute is applied to a first device, and referring to FIG. 8, the method comprises the following steps.

In S801, BGP extended community attribute information corresponding to a traffic flow is obtained according to a traffic flow reporting instruction.

Herein, for the first device, if the BGP extended community attribute information corresponding to the traffic flow is required to be reported, when the traffic flow passes, the corresponding BGP extended community attribute information is obtained according to the traffic flow reporting instruction.

Specifically, the first device may be a router, a 3-layer switch, a server, a dedicated traffic flow collecting device and the like.

In S802, the obtained BGP extended community attribute information is reported to second device through a traffic flow reporting protocol.

The first device and the second device in the embodiment are the same as the abovementioned embodiments, and will not be elaborated herein.

The "traffic flow reporting protocol" in the step is a protocol obtained by extending an IPFIX protocol or private protocols of some manufacturers such as netstream and netflow in the conventional art. A field or IE defined to report the BGP extended community attribute information is added in the traffic flow reporting protocol in the conventional art to extend the traffic flow reporting protocol, so that the first device contains the BGP extended community attribute information corresponding to the traffic flow in reported traffic flow information.

From the above, according to the technical solution provided by the embodiment of the disclosure, the traffic flow reporting protocol is extended, all BGP extended community attribute information corresponding to the traffic flow may be directly reported through the extended traffic flow reporting protocol, and then the second device may directly collect a traffic flow value corresponding to the BGP extended community attribute information, is not required to learn a BGP route, and is also not required to execute operations of BGP table lookup and the like according to reported flow information, so that requirements on a function and performance of the second device are greatly reduced. Meanwhile, all the BGP extended community attribute information corresponding to the traffic flow may be reported to the second device through the extended traffic flow reporting protocol, so that a requirement of an application market may be met better.

Specifically, not only is whether to report the BGP extended community attribute information corresponding to the traffic flow or not preconfigured, but also a type of the BGP extended community attribute information required to be reported may also be preconfigured. When the traffic flow passes, BGP extended community attribute information of a corresponding address of the traffic flow is obtained according to the preconfigured type of the BGP extended community attribute information required to be reported.

Herein, the type of the BGP extended community attribute information at least comprises: BGP community attribute information corresponding to a source address of the traffic flow and/or BGP extended community attribute information corresponding to a destination address of the traffic flow. When the preconfigured BGP extended community attribute information required to be reported is the BGP extended community attribute information corresponding to the source address of the traffic flow, the abovementioned "corresponding address" is the source address: and when the preconfigured BGP extended community attribute information required to be reported is the BGP extended community attribute information corresponding to the destination address of the traffic flow, the abovementioned "corresponding address" is the destination address, that is, it may be configured that only the BGP extended community attribute information corresponding to the source address of the traffic flow is reported, or it is configured that only the BGP extended community attribute information corresponding to the destination address of the traffic flow is reported, or it is configured that the BGP extended community attribute information corresponding to the source address and destination address of the traffic flow is simultaneously reported.

Specifically, the first device obtains the BGP extended community attribute information of the corresponding address of the traffic flow according to the preconfigured type of the BGP extended community attribute information required to be reported in the following specific implementation manner.

In S901, address information corresponding to the type of the BGP extended community attribute information required to be reported is acquired according to the preconfigured type of the BGP extended community attribute information required to be reported.

That is, if the BGP extended community attribute information required to be reported is the BGP extended community attribute information corresponding to the source address of the traffic flow, source address information of the traffic flow is acquired; and if the BGP extended community attribute information required to be reported is the BGP extended community attribute information corresponding to the destination address of the traffic flow, destination address information of the traffic flow is acquired.

In S902, a BGP route corresponding to the address information is determined.

Herein, a BGP routing table or a data structure generated by the BGP routing table and more convenient for acquiring of the community attribute information may be acquired according to the source address or destination address of the traffic flow to determine the BGP route corresponding to the source address or the destination address.

In S903, the corresponding BGP extended community attribute information is obtained from the determined BGP route.

After the BGP route corresponding to the source address or destination address of the traffic flow is determined the extended community attribute information may be extracted from the corresponding BGP route, and then the obtained extended community attribute information is added into corresponding related information of the traffic flow for reporting to the second device.

Herein, if a traffic flow sampled by a router is not a new traffic flow, the BGP routing table (or the data structure generated by the BGP routing table and more convenient for acquiring of the extended community attribute information) is not required to be acquired again because extended community attribute information corresponding to this traffic flow has been found and stored in the related information of the traffic flow during establishment as a new traffic flow.

Herein, the operation of looking up the BGP routing table for the extended community attribute information may be completed together with another operation of looking up the BGP routing table to improve efficiency. For example, when AS information corresponding to the source address of the traffic flow is reported, the BGP routing table is also required to be looked up according to the source address of the traffic flow to obtain a BGP route corresponding to the source address, and at this moment, the AS information and the extended community attribute information may be directly extracted from the BGP route and stored in the related information of the traffic flow respectively.

Specifically, after the BGP extended community attribute information of the traffic flow is obtained, during traffic flow reporting, the obtained BGP extended community attribute information may be reported to the second device through the traffic flow reporting protocol, and a specific implementation way is as follows: the obtained BGP extended community attribute information is reported to the second device by an IEs defined to report the BGP extended community attribute information in the traffic flow reporting protocol, herein the IEs at least comprises: a third IE defined to report the BGP extended community attribute information corresponding to the source address of the traffic flow and a fourth IE defined to report the BGP extended community attribute information corresponding to the destination address of the traffic flow.

Figure 10:
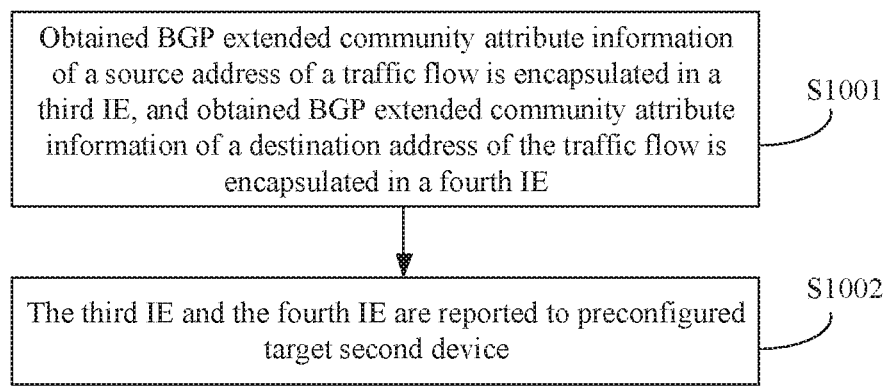
FIG. 10 is a third flowchart of a method for collecting a traffic flow value corresponding to a BGP extended community attribute according to a third embodiment of the disclosure.

Specifically, referring to FIG. 10, a specific implementation manner for reporting the obtained BGP extended community attribute information to the second device through the IE defined to report the BGP extended community attribute information in the traffic flow reporting protocol includes the following steps.

In S1001, the obtained BGP extended community attribute information corresponding to the source address of the traffic flow is encapsulated in the third IE, and the obtained BGP extended community attribute information corresponding to the destination address of the traffic flow is encapsulated in the fourth IE.

For reporting the obtained BGP extended community attribute information of the traffic flow to the second device, in the embodiment of the disclosure, two IEs are preferably added into the traffic flow reporting protocol: the third IE defined to report the BGP extended community attribute information corresponding to the source address of the traffic flow and the fourth IE defined to report the BGP extended community attribute information corresponding to the destination address of the traffic flow.

During traffic flow reporting, the BGP extended community attribute information of the source address of the traffic flow is encapsulated in the first IE and the BGP extended community attribute information of the destination address of the traffic flow is encapsulated in the second IE for reporting to the second device. Then, the second device is not required to learn the BGP route, and is also not required to execute the operations of BGP table lookup and the like according to the reported traffic flow information, so that the requirements on the function and performance of the second device are greatly reduced.

In S1002, the first IE and the second IE are reported to the preconfigured target second device.

Herein, for the first device, a traffic flow analysis server(s) to which the reporting is directed may be preconfigured, that is, a target analysis server for receiving the traffic flow reporting may be preconfigured.

For further understanding the first IE and the second IE, further explanations and descriptions will be made below.

A purpose of extending the traffic flow reporting protocol, namely adding the IE in the traffic flow reporting protocol, is to ensure that the traffic flow information reported by the first device contains the BGP extended community attribute information corresponding to the traffic flow.

Specifically, the standard IPFIX protocol may be extended, and the private protocols such as netstream and netflow of some manufacturers may also be similarly extended.

In the embodiment of the disclosure, three new IEs are defined, i.e., bgpSourceExtendedCommunityList (BGP source extended community attribute list) and bgpDestinationExtendedCommunityList (BGP destination extended community attribute list), to report the extended community attribute information of BGP routes corresponding to the source address and destination address of the traffic flow. Of course, it can be understood that the three new IEs may also be in another form, as long as they ma be configured to report the extended community attribute information of the BGP routes corresponding to the source address and destination address of the traffic flow. Herein, Table 3 shows specifications about specific information contents of the two IEs bgpSourceExtendedCommunityList and bgpDestinationExtendedCommunityList, comprising: information such as an element ID, a name, a data type, data type semantics, a description and a unit. Each element in bgpSourceExtendedCommunityList (BGP source extended community attribute list) and bgpDestinationExtendedCommunityList (BGP destination extended community attribute list) is a specific BGP extended community, and its format is specified by the newly defined bgpExtendedCommunity IE, as shown in Table 4. When obtaining the BGP extended community information, the first device may perform corresponding content filling and reports it to the second device, and the second device may also parse the corresponding contents (in Table 3, IANA is the Internet Assigned Numbers Authority). Of course, this is only an example, and the contents in Table 3 may be reduced, or added or changed according to a requirement under a practical condition.

TABLE 3

| Element ID | Name | Data Type | Data Type Semantics | Description | Units |
|---|---|---|---|---|---|
| Allocated by the IANA after standardization | bgpSourceExtendedCommunityList | basicList (defined by RFC6313) | List | BGPextended community attribute information corresponding to the source address of the related traffic flow | NULL |
| Allocated by the IANA after standardization | bgpDestinationExtendedCommunityList | basicList (defined by RFC6313) | List | BGPextended community attribute information corresponding to the destination address of the related traffic flow | NULL |

TABLE 4

| Element ID | Name | Data Type | Data Type Semantics | Description | Units |
|---|---|---|---|---|---|
| Allocated by the IANA after standardization | bgpExtendedCommunity | 8-octet quantity (8-byte figure) | quantity (figure) | BGP extended community attribute defined in BFC4360 | NULL |

From the above, according to the technical solution provided by the embodiment of the disclosure, the traffic flow reporting protocol is extended, the new field or IE is added in the traffic flow reporting protocol, then the first device may directly report the BGP extended community attribute information, and the second device may directly collect the traffic flow value corresponding to the BGP extended community attribute information, is not required to learn the BGP route, and is also not required to execute the operations of BGP table lookup and the like according to the reported traffic flow information, so that the requirements on the function and performance of the second device are greatly reduced. In addition, since the second device may directly collect the traffic flow value corresponding to the BGP extended community attribute information in the solution, network flows may be conveniently regulated for balancing, a source and destination of the traffic flow may be simultaneously considered for accurate scheduling, for example, a starting point for traffic flow scheduling may be regulated to be appropriately close to a source point of the traffic flow according to determining information of the source, and the requirement of the application market may be met better.

In addition, it is important to understand that descriptions about processing manners for the BGP community attribute information and the BGP extended community attribute information are made in the abovementioned three embodiments respectively, but there may exist the condition that the two types of information exist at the same time and are processed at the same time during practical processing. For a scenario where the two types of information exist at the same time, a processing flow is the same as the processing flow of any embodiment in the abovementioned three embodiments, and will not be elaborated herein.

Fourth Embodiment

Figure 11:
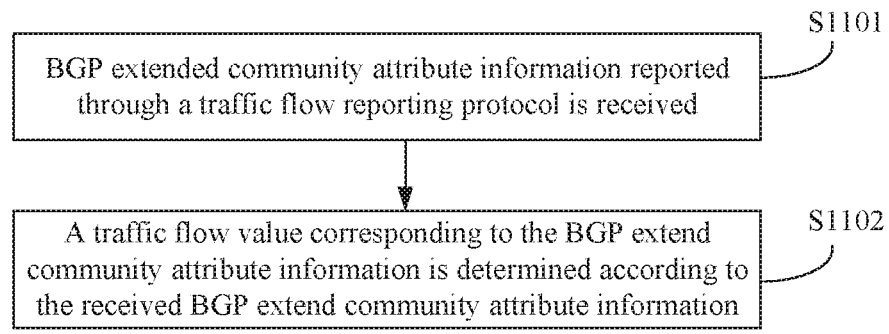
FIG. 11 is a first flowchart of a method for collecting a traffic flow value corresponding to a BGP extended community attribute according to a fourth embodiment of the disclosure.

The embodiment of the disclosure provides a method for collecting a traffic flow value corresponding to a BGP extended community attribute, which is applied to a traffic flow analysis server side (a second device). Referring to FIG. 11, the method includes the following steps.

In S1101, BGP extended community attribute information reported through a traffic flow reporting protocol is received.

The "traffic flow reporting protocol" in the step is a protocol obtained by extending an IPFIX protocol or private protocols of some manufacturers such as netstream and netflow in the conventional art. A field or IE defined to report the BGP extended community attribute information is added in the traffic flow reporting protocol in the conventional art to extend the traffic flow reporting protocol, so that first device contains BGP extended community attribute information corresponding to a traffic flow in reported traffic flow information.

In S1102, a traffic flow value corresponding to the BGP extended community attribute information is determined according to the received BGP extended community attribute information.

That is, the traffic flow analysis server may determine the traffic flow value corresponding to the BGP extended community attribute information for traffic flow collecting according to the received BGP extended community attribute information.

Figure 12:
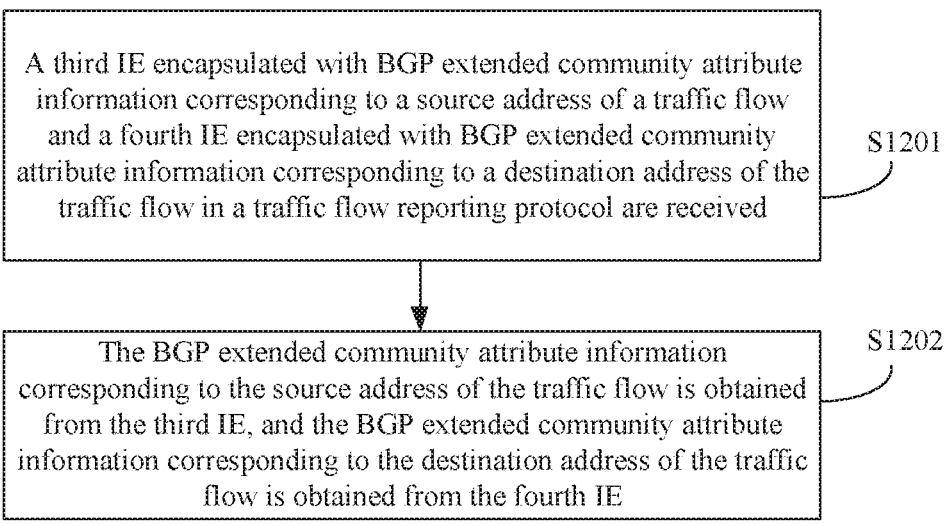
FIG. 12 is a second flowchart of a method for collecting a traffic flow value corresponding to a BGP extended community attribute according to a fourth embodiment of the disclosure.

Specifically, referring to FIG. 12, the second device receives the BGP extended community attribute information reported through the traffic flow reporting protocol in the following specific implementation manner.

In S1201, a third IE encapsulated with BGP extended community attribute information corresponding to a source address of a traffic flow and a fourth IE encapsulated with BGP extended community attribute information corresponding to a destination address of the traffic flow in the traffic flow reporting protocol are received.

For reporting the obtained BGP extended community attribute information of the traffic flow to the second device, in the embodiment of the disclosure, two IEs are preferably added into the traffic flow reporting protocol: the third IE defined to report the BGP extended community attribute information corresponding to the source address of the traffic flow and the fourth IE defined to report the BGP extended community attribute information corresponding to the destination address of the traffic flow.

During traffic flow reporting, the BGP extended community attribute information of the source address of the traffic flow is encapsulated in the third IE and the BGP extended community attribute information corresponding to the destination address of the traffic flow is encapsulated in the fourth IE for reporting to the second device. Then, the second device is not required to learn a BGP route, and is also not required to execute operations of BGP table lookup and the like according to reported flow information, so that requirements on a function and performance of the second device are greatly reduced.

In S1202, the BGP extended community attribute information corresponding to the source address of the traffic flow is obtained from the third IE, and the BGP extended community attribute information corresponding to the destination address of the traffic flow is obtained from the fourth IE.

After receiving the third IE and the fourth IE, the second device may extract the corresponding BGP extended community attribute information therefrom for further analysis and processing.

Furthermore, the second device may determine a traffic flow value corresponding to the BGP extended community attribute information corresponding to the source address of the traffic flow according to the BGP extended community attribute information corresponding to the source address of the traffic flow and determine a traffic flow value corresponding to the BGP extended community attribute information corresponding to the destination address of the traffic flow according to the BGP extended community attribute information corresponding to the destination address of the traffic flow for further traffic flow collecting.

From the above, according to the technical solution provided by the embodiment of the disclosure, the traffic flow reporting protocol is extended, the BGP extended community attribute information corresponding to the traffic flow may be directly reported through the extended traffic flow reporting protocol, and then the second device may directly collect the traffic flow value corresponding to the BGP extended community attribute information, is not required to learn the BGP route, and is also not required to execute operations of BGP table lookup and the like according to reported traffic flow information, so that the requirements on the function and performance of the second device are greatly reduced. Meanwhile, all the BGP extended community attribute information may be reported to the second device through the extended traffic flow reporting protocol, so that a requirement of an application market may be met better.

Similarly, by extending the traffic flow reporting protocol such as the IPFX, the first device may further report more BGP attribute information to the second device.

Fifth Embodiment

Figure 13:
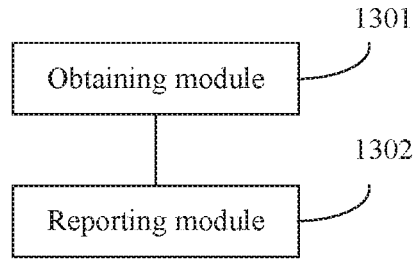
FIG. 13 is a first block diagram of a device for collecting a traffic flow value corresponding to a BGP community attribute or a BGP extended community attribute according to a fifth embodiment of the disclosure.

According to the embodiment of the disclosure, a first device is provided, which, referring to FIG. 13, includes:

an obtaining module 1301, configured to obtain BGP community attribute information or BGP extended community attribute information corresponding to a traffic flow according to a traffic flow reporting instruction: and a reporting module 1302, configured to report the obtained BGP community attribute information or BGP extended community attribute information to second device through a traffic flow reporting protocol.

Figure 14:
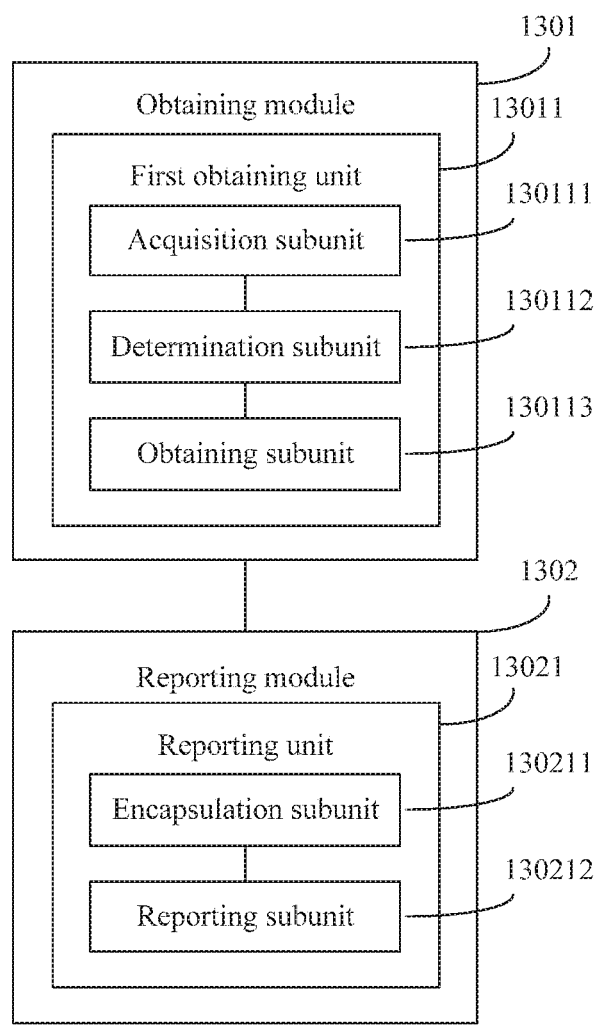
FIG. 14 is a second block diagram of a device for collecting a traffic flow value corresponding to a BGP community attribute or a BGP extended community attribute according to a fifth embodiment of the disclosure.

Furthermore, referring to FIG. 14, the obtaining module 1301 includes:

a first obtaining unit 13011, configured to obtain BGP community attribute information corresponding to a corresponding address of the traffic flow according to a type of BGP community attribute information required to be reported, or obtain BGP extended community attribute information corresponding to the corresponding address of the traffic flow according to a type of BGP extended community attribute information required to be reported, wherein, when the BGP community attribute information required to be reported is BGP community attribute information corresponding to a source address of the traffic flow, the corresponding address is the source address; when the BGP community attribute information required to be reported is BGP community attribute information corresponding to a destination address of the traffic flow, the corresponding address is the destination address; when the BGP community attribute information required to be reported is the BGP community attribute information corresponding to the source address of the traffic flow and the BGP community attribute information corresponding to the destination address of the traffic flow, the corresponding address is the source address and the destination address; when the BGP extended community attribute information required to be reported is BGP extended community attribute information corresponding to the source address of the traffic flow, the corresponding address is the source address: when the BGP extended community attribute information required to be reported is BGP extended community attribute information corresponding to the destination address of the traffic flow, the corresponding address is the destination address; and when the BGP extended community attribute information required to be reported is the BGP extended community attribute information corresponding to the source address of the traffic flow and the BGP extended community attribute information corresponding to the destination address of the traffic flow, the corresponding address is the source address and the destination address.

Furthermore, referring to FIG. 14, the first obtaining unit 13011 includes:

an acquisition subunit 130111, configured to acquire address information corresponding to the type of the BGP community attribute information required to be reported according to the type of the BGP community attribute information required to be reported, or acquire address information corresponding to the type of the BGP extended community attribute information required to be reported according to the type of the BGP extended community attribute information required to be reported:

a determination subunit 130112, configured to determine a BGP route corresponding to the address information; and an obtaining subunit 130113, configured to obtain the corresponding BGP community attribute information and/or BGP extended community attribute information from the determined BGP route.

Furthermore, referring to FIG. 14, the reporting module 1302 includes:

a reporting unit 13021, configured to report the obtained BGP community attribute information or BGP extended community attribute information to the second device through an IE defined to report the BGP community attribute information or the BGP extended community attribute information in the traffic flow reporting protocol, wherein the IE(s) includes at least one of: a first IE defined to report the BGP community attribute information corresponding to the source address of the traffic flow, a second IE defined to report the BGP community attribute information corresponding to the destination address of the traffic flow, a third IE defined to report the BGP extended community attribute information corresponding to the source address of the traffic flow or a fourth IE defined to report the BGP extended community attribute information corresponding to the destination address of the traffic flow.

Furthermore, referring to FIG. 14, the reporting unit 13021 includes:

an encapsulation subunit 130211, configured to encapsulate the obtained BGP community attribute information of the source address of the traffic flow in the first IE, encapsulate the obtained BGP community attribute information of the destination address of the traffic flow in the second IE, encapsulate the obtained BGP extended community attribute information of the source address of the traffic flow in the third IE, or encapsulate the obtained BGP extended community attribute information of the destination address of the traffic flow in the fourth IE; and a reporting subunit 130212, configured to report the first IE, the second IE, the third IE or the fourth IE to the preconfigured target second device.

From the above, according to the technical solution provided by the embodiment of the disclosure, the BGP community attribute information or BGP extended community attribute information corresponding to the traffic flow may be directly reported through the extended traffic flow reporting protocol, and then the second device may directly collect the traffic flow value corresponding to the BGP community attribute information or the BGP extended community attribute information, is not required to learn the BGP route, and is also not required to execute operations of BGP table lookup and the like according to reported traffic flow information, so that requirements on a function and performance of the second device are greatly reduced. Meanwhile, all BGP community attribute information or BGP extended community attribute information corresponding to the traffic flow may be reported to the second device through the extended traffic flow reporting protocol, so that a requirement of an application market may be met better.

It is important to note that the device is a device corresponding to the method for collecting the traffic flow value corresponding to the BGP community attribute in the first embodiment and the method for collecting the traffic flow value corresponding to the BGP extended community attribute in the third embodiment, all implementation modes in the first embodiment and the third embodiment are applied to the embodiment of the device, and the same technical effect may be achieved.

Sixth Embodiment

Figure 15:
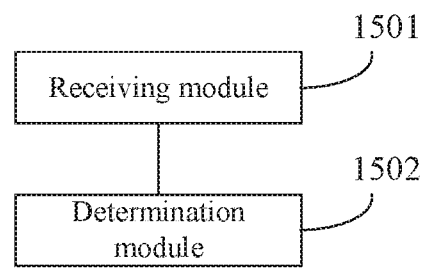
FIG. 15 is a first block diagram of a device for collecting a traffic flow value corresponding to a BGP community attribute or a BGP extended community attribute according to a sixth embodiment of the disclosure.

According to the embodiment of the disclosure, a second device is provided. Referring to FIG. 15, the second device comprises:

a receiving module 1501, configured to receive BGP community attribute information or BGP extended community attribute information reported through a traffic flow reporting protocol; and a determination module 1502, configured to determine a traffic flow value corresponding to the BGP community attribute information according to the received BGP community attribute information, or determine a traffic flow value corresponding to the BGP extended community attribute information according to the received BGP extended community attribute information.

Figure 16:
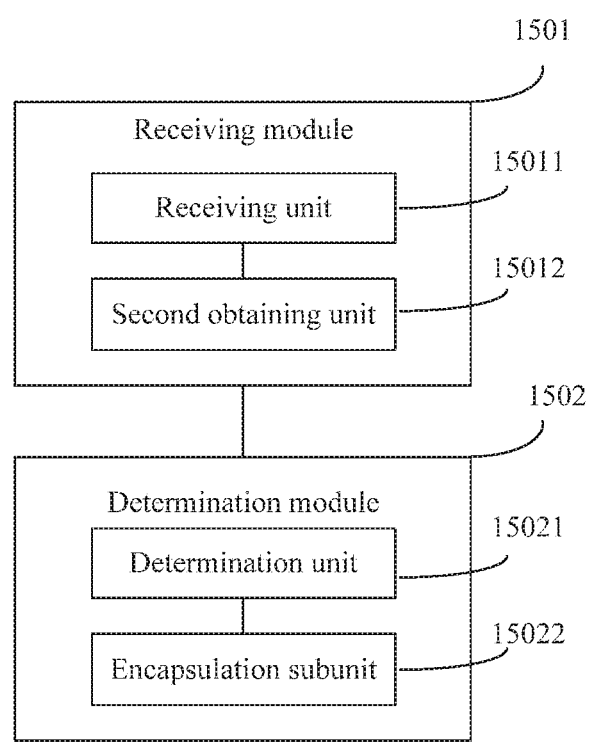
FIG. 16 is a second block diagram of a device for collecting a traffic flow value corresponding to a BGP community attribute or a BGP extended community attribute according to a sixth embodiment of the disclosure.

Furthermore, referring to FIG. 16, the receiving module 1501 includes:

a receiving unit 15011, configured to receive a first IE encapsulated with BGP community attribute information corresponding to a source address of a traffic flow, second IE encapsulated with BGP community attribute information corresponding to a destination address of the traffic flow, third IE encapsulated with BGP extended community attribute information corresponding to the source address of the traffic flow or fourth IE encapsulated with BGP extended community attribute information corresponding to the destination address of the traffic flow in the traffic flow reporting protocol; and a second obtaining unit 15012, configured to obtain the BGP community attribute information corresponding to the source address of the traffic flow from the first IE, obtain the BGP community attribute information corresponding to the destination address of the traffic flow from the second IE, obtain the BGP extended community attribute information corresponding to the source address of the traffic flow from the third IE, or obtain the BGP extended community attribute information corresponding to the destination address of the traffic flow from the fourth IE.

Furthermore, referring to FIG. 16, the determination module 1502 includes:

a determination unit 15021, configured to determine a traffic flow value corresponding to the BGP community attribute information corresponding to the source address of the traffic flow according to the BGP community attribute information corresponding to the source address of the traffic flow, and determine a traffic flow value corresponding to the BGP community attribute information corresponding to the destination address of the traffic flow according to the BGP community attribute information corresponding to the destination address of the traffic flow; and determine a traffic flow value corresponding to the BGP extended community attribute information corresponding to the source address of the traffic flow according to the BGP extended community attribute information corresponding to the source address of the traffic flow, and determine a traffic flow value corresponding to the BGP extended community attribute information corresponding to the destination address of the traffic flow according to the BGP extended community attribute information corresponding to the destination address of the traffic flow.

From the above, according to the technical solution provided by the embodiment of the disclosure, the traffic flow reporting protocol is extended, all BGP community attribute information or BGP extended community attribute information corresponding to the traffic flow may be directly reported through the extended traffic flow reporting protocol, and then the second device may directly collect the traffic flow value corresponding to the BGP community attribute information or the BGP extended community attribute information, is not required to learn a BGP route, and is also not required to execute operations of BGP table lookup and the like according to reported traffic flow information, so that requirements on a function and performance of the second device are greatly reduced. Meanwhile, all the BGP community attribute information or BGP extended community attribute information corresponding to the traffic flow may be reported to the second device through the extended traffic flow reporting protocol, so that a requirement of an application market may be met better.

It is important to note that the device is a device corresponding to the method for collecting the traffic flow value corresponding to the BGP community attribute in the second embodiment and the method for collecting the traffic flow value corresponding to the BGP extended community attribute in the fourth embodiment, all implementation modes in the second embodiment and the fourth embodiment are applied to the embodiment of the device, and the same technical effect may be achieved.

Each embodiment in the specification is described progressively, each embodiment focuses on a difference with the other embodiments, and the same and similar parts of each embodiment may refer to one another.

Those skilled in the art should know that the embodiment of the disclosure may be provided as a method, a device or a computer program product. Therefore, the embodiment of the disclosure may adopt a form of pure hardware embodiment, pure software embodiment and combined software and hardware embodiment. Moreover, the embodiment of the disclosure may adopt a form of computer program product implemented on one or more computer-available storage media (including, but not limited to, a disk memory, a Compact Disc Read-Only Memory (CD-ROM) and an optical memory) including computer-available program codes.

The embodiment of the disclosure is described with reference to flowcharts and/or block diagrams of the method, terminal device (system) and computer program product according to the embodiment of the disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing device to generate a machine, so that a device for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

Although the preferred embodiments of the embodiments of the disclosure have been described, those skilled in the art may made other variations and modifications to these embodiments once learning about the basic creative concept. Therefore, the appended claims are expected to be explained to include the preferred embodiments and all the variations and modifications falling within the scope of the embodiment of the disclosure.

It is also important to note that, in the disclosure, relational terms such as first and second are only adopted to distinguish one entity or operation from another entity or operation, and do not always require that these entities or operations form any such practical relationship or sequence. Moreover, terms "include" and "contain" or any other variant is intended to cover nonexclusive inclusions, so that a process, method, object or terminal device including a series of elements not only includes these elements, but also includes other elements which are not listed clearly, or further includes elements intrinsic to the process, the method, the object or the terminal device. Under the condition of no more restrictions, for an element defined by a statement "include a/an . . . ", there may nonexclusively exist the same other element in the process, method, object or terminal device including the element.

The invention claimed is:

1. A method for collecting a traffic flow information of a Border Gateway Protocol (BGP) community attribute or BGP extended community attribute, applied to a first device, the method comprising:
   obtaining at least one of BGP community attribute information or BGP extended community attribute information corresponding to a traffic flow according to a traffic flow reporting instruction; and
   reporting at least one of the obtained BGP community attribute information or BGP extended community attribute information to a second device through a traffic flow reporting protocol,
   wherein the traffic flow reporting protocol comprises one or more Information Elements (IEs) defined to report the at least one of the BGP community attribute information or the BGP extending community attribute information.

2. The method according to claim 1, wherein the obtaining at least one of the BGP community attribute information or BGP extended community attribute information corresponding to the traffic flow according to the traffic flow reporting instruction comprises at least one of the following:
   obtaining BGP community attribute information corresponding to a corresponding address of the traffic flow according to a type of BGP community attribute information required to be reported, or
   obtaining BGP extended community attribute information corresponding to a corresponding address of the traffic flow according to a type of BGP extended community attribute information required to be reported,
   wherein, when the BGP community attribute information required to be reported is BGP community attribute information corresponding to a source address of the traffic flow, the corresponding address is the source address;
   when the BGP community attribute information required to be reported is BGP community attribute information corresponding to a destination address of the traffic flow, the corresponding address is the destination address;
   when the BGP community attribute information required to be reported is the BGP community attribute information corresponding to the source address of the traffic flow and the BGP community attribute information corresponding to the destination address of the traffic flow, the corresponding address is the source address and the destination address;
   when the BGP extended community attribute information required to be reported is BGP extended community attribute information corresponding to the source address of the traffic flow, the corresponding address is the source address;
   when the BGP extended community attribute information required to be reported is BGP extended community attribute information corresponding to the destination address of the traffic flow, the corresponding address is the destination address; and
   when the BGP extended community attribute information required to be reported is the BGP extended community attribute information corresponding to the source address of the traffic flow and the BGP extended community attribute information corresponding to the destination address of the traffic flow, the corresponding address is the source address and the destination address.

3. The method according to claim 2, wherein the obtaining at least one of the BGP community attribute information or the BGP extended community attribute information corresponding to the corresponding address of the traffic flow according to at least one of the type of the BGP community attribute information required to be reported or the type of the BGP extended community attribute information required to be reported comprises:

acquiring at least one of address information corresponding to the type of the BGP community attribute information required to be reported or address information corresponding to the type of the BGP extended community attribute information required to be reported according to at least one of the type of the BGP community attribute information required to be reported, or the type of the BGP extended community attribute information required to be reported;

determining a BGP route corresponding to the address information; and obtaining at least one of the corresponding BGP community attribute information or BGP extended community attribute information from the determined BGP route.

4. The method according to claim 1, wherein the reporting at least one of the obtained BGP community attribute information or BGP extended community attribute information to the second device through the traffic flow reporting protocol comprises:

reporting at least one of the obtained BGP community attribute information or BGP extended community attribute information to the second device through the one or more Information Elements (IEs) defined to report at least one of the BGP community attribute information or the BGP extended community attribute information in the traffic flow reporting protocol, wherein the one or more IEs comprises at least one of: a first IE defined to report the BGP community attribute information corresponding to the source address of the traffic flow, a second IE defined to report the BGP community attribute information corresponding to the destination address of the traffic flow, a third IE defined to report the BGP extended community attribute information corresponding to the source address of the traffic flow or a fourth IE defined to report the BGP extended community attribute information corresponding to the destination address of the traffic flow.

5. The method according to claim 4, wherein the reporting at least one of the obtained BGP community attribute information or BGP extended community attribute information to the second device through the one or more IEs defined to report at least one of the BGP community attribute information or the BGP extended community attribute information in the traffic flow reporting protocol comprises at least one of:

encapsulating the obtained BGP community attribute information of the source address of the traffic flow in the first IE, and reporting the first IE to the second device;

encapsulating the obtained BGP community attribute information of the destination address of the traffic flow in the second IE, and reporting the second IE to the second device;

encapsulating the obtained BGP extended community attribute information of the source address of the traffic flow in the third IE, and reporting the third IE to the second device;

or, encapsulating the obtained BGP extended community attribute information of the destination address of the traffic flow in the fourth IE, and reporting the fourth IE to the second device.

6. A method for collecting a traffic flow information of a Border Gateway Protocol (BGP) community attribute or BGP extended community attribute, applied to a second device, the method comprising:

receiving at least one of BGP community attribute information or BGP extended community attribute information reported through a traffic flow reporting protocol; and determining at least one of a traffic flow information corresponding to the BGP community attribute information or a traffic flow information corresponding to the BGP extended community attribute information according to at least one of the received BGP community attribute information, or the received BGP extended community attribute information, wherein the traffic flow reporting protocol comprises one or more Information Elements (IEs) defined to report the at least one of the BGP community attribute information or the BGP extending community attribute information.

7. The method according to claim 6, wherein the receiving at least one of the BGP community attribute information or BGP extended community attribute information reported through the traffic flow reporting protocol comprises:

receiving at least one of the following Information Elements (IEs) in the traffic flow reporting protocol: a first IE encapsulated with BGP community attribute information corresponding to a source address of a traffic flow, a second IE encapsulated with BGP community attribute information corresponding to a destination address of the traffic flow, a third IE encapsulated with BGP extended community attribute information corresponding to the source address of the traffic flow, or a fourth IE encapsulated with BGP extended community attribute information corresponding to the destination address of the traffic flow; and obtaining at least one of the BGP community attribute information or BGP extended community attribute in at least one of the following ways:

obtaining the BGP community attribute information corresponding to the source address of the traffic flow from the first IE, obtaining the BGP community attribute information corresponding to the destination address of the traffic flow from the second IE, obtaining the BGP extended community attribute information corresponding to the source address of the traffic flow from the third IE, or, obtaining the BGP extended community attribute information corresponding to the destination address of the traffic flow from the fourth IE.

8. The method according to claim 7, wherein the determining at least one of the traffic flow information corresponding to the BGP community attribute information or the traffic flow information corresponding to the BGP extended community attribute information according to at least one of the received BGP community attribute information or the received BGP extended community attribute information comprises at least one of the following:

determining a traffic flow information corresponding to the BGP community attribute information corresponding to the source address of the traffic flow according to the BGP community attribute information corresponding to the source address of the traffic flow, and determining a traffic flow information corresponding to the BGP community attribute information corresponding to the destination address of the traffic flow according to the BGP community attribute information corresponding to the destination address of the traffic flow;

or, determining a traffic flow information corresponding to the BGP extended community attribute information corresponding to the source address of the traffic flow according to the BGP extended community attribute information corresponding to the source address of the traffic flow, and determining a traffic flow information corresponding to the BGP extended community attribute information corresponding to the destination address of the traffic flow according to the BGP extended community attribute information corresponding to the destination address of the traffic flow.

9. A first device, comprising a first processor and a first memory storing computer-readable operation instructions, wherein when the computer-readable operation instructions in the first memory are run, the first processor is configured to:

obtain at least one of Border Gateway Protocol (BGP) community attribute information or BGP extended community attribute information corresponding to a traffic flow according to a traffic flow reporting instruction; and report at least one of the obtained BGP community attribute information or BGP extended community attribute information to a second device through a traffic flow reporting protocol, wherein the traffic flow reporting protocol comprises one or more Information Elements (IEs) defined to report the at least one of the BGP community attribute information or the BGP extending community attribute information.

10. The first device according to claim 9, wherein the first processor is further configured to:

obtain at least one of BGP community attribute information or BGP extended community attribute information corresponding to a corresponding address of the traffic flow according to at least one of a type of BGP community attribute information required to be reported, or a type of BGP extended community attribute information required to be reported, wherein, when the BGP community attribute information required to be reported is BGP community attribute information corresponding to a source address of the traffic flow, the corresponding address is the source address;

when the BGP community attribute information required to be reported is BGP community attribute information corresponding to a destination address of the traffic flow, the corresponding address is the destination address;

when the BGP community attribute information required to be reported is the BGP community attribute information corresponding to the source address of the traffic flow and the BGP community attribute information corresponding to the destination address of the traffic flow, the corresponding address is the source address and the destination address;

when the BGP extended community attribute information required to be reported is BGP extended community attribute information corresponding to the source address of the traffic flow, the corresponding address is the source address;

when the BGP extended community attribute information required to be reported is BGP extended community attribute information corresponding to the destination address of the traffic flow, the corresponding address is the destination address; and when the BGP extended community attribute information required to be reported is the BGP extended community attribute information corresponding to the source address of the traffic flow and the BGP extended community attribute information corresponding to the destination address of the traffic flow, the corresponding address is the source address and the destination address.

11. The first device according to claim 10, wherein the first processor is further configured to:

acquire at least one of address information corresponding to the type of the BGP community attribute information required to be reported or address information corresponding to the type of the BGP extended community attribute information required to be reported according to at least of the type of the BGP community attribute information required to be reported, or the type of the BGP extended community attribute information required to be reported;

determine a BGP route corresponding to the address information; and obtain at least one of the corresponding BGP community attribute information or BGP extended community attribute information from the determined BGP route.

12. The first device according to claim 9, wherein the first processor is further configured to:

report at least one of the obtained BGP community attribute information or BGP extended community attribute information to the second device through the one or more Information Elements (IEs) defined to report at least one of the BGP community attribute information or the BGP extended community attribute information in the traffic flow reporting protocol, wherein the one or more IEs comprises at least one of: a first IE defined to report the BGP community attribute information corresponding to the source address of the traffic flow, a second IE defined to report the BGP community attribute information corresponding to the destination address of the traffic flow, a third IE defined to report the BGP extended community attribute information corresponding to the source address of the traffic flow or a fourth IE defined to report the BGP extended community attribute information corresponding to the destination address of the traffic flow.

13. The first device according to claim 12, wherein the first processor is further configured to:

implement at least one of: encapsulate the obtained BGP community attribute information of the source address of the traffic flow in the first IE, encapsulate the obtained BGP community attribute information of the destination address of the traffic flow in the second IE, encapsulate the obtained BGP extended community attribute information of the source address of the traffic flow in the third IE, or, encapsulate the obtained BGP extended community attribute information of the destination address of the traffic flow in the fourth IE; and
report at least one of the first IE, the second IE, the third IE or the fourth IE to the second device.

14. A second device, comprising a second processor and a second memory storing computer-readable operation instructions, wherein when the computer-readable operation instructions in the second memory are run, the second processor is configured to:
receive at least one of Border Gateway Protocol (BGP) community attribute information or BGP extended community attribute information reported through a traffic flow reporting protocol; and
determine at least one of a traffic flow information corresponding to the BGP community attribute information or a traffic flow information corresponding to the BGP extended community attribute information according to at least one of the received BGP community attribute information, or the received BGP extended community attribute information,
wherein the traffic flow reporting protocol comprises one or more Information Elements (IEs) defined to report the at least one of the BGP community attribute information or the BGP extending community attribute information.

15. The second device according to claim 14, wherein the second processor is configured to:
receive at least one of the following Information Elements (IEs) in the traffic flow reporting protocol: a first IE encapsulated with BGP community attribute information corresponding to a source address of a traffic flow, a second IE encapsulated with BGP community attribute information corresponding to a destination address of the traffic flow, a third IE encapsulated with BGP extended community attribute information corresponding to the source address of the traffic flow, or a fourth IE encapsulated with BGP extended community attribute information corresponding to the destination address of the traffic flow; and
implement at least one of the following: obtain the BGP community attribute information corresponding to the source address of the traffic flow from the first IE, obtain the BGP community attribute information corresponding to the destination address of the traffic flow from the second IE, obtain the BGP extended community attribute information corresponding to the source address of the traffic flow from the third IE, or, obtain the BGP extended community attribute information corresponding to the destination address of the traffic flow from the fourth IE.

16. The second device according to claim 14, wherein the second processor is configured to:
implement at least one of the following: determine a traffic flow information corresponding to the BGP community attribute information corresponding to the source address of the traffic flow according to the BGP community attribute information corresponding to the source address of the traffic flow, and determine a traffic flow information corresponding to the BGP community attribute information corresponding to the destination address of the traffic flow according to the BGP community attribute information corresponding to the destination address of the traffic flow;
or, determine a traffic flow information corresponding to the BGP extended community attribute information corresponding to the source address of the traffic flow according to the BGP extended community attribute information corresponding to the source address of the traffic flow, and determine a traffic flow information corresponding to the BGP extended community attribute information corresponding to the destination address of the traffic flow according to the BGP extended community attribute information corresponding to the destination address of the traffic flow.

* * * * *